(12) United States Patent
Kane-Parry et al.

(10) Patent No.: US 9,336,381 B1
(45) Date of Patent: May 10, 2016

(54) ENTROPY-BASED DETECTION OF SENSITIVE INFORMATION IN CODE

(71) Applicant: AMAZON TECHNOLOGIES, INC., Reno, NV (US)

(72) Inventors: David James Kane-Parry, Seattle, WA (US); Thibault Candebat, Saint Germain en Laye (FR)

(73) Assignee: Amazon Technologies, Inc., Reno, NV (US)

( * ) Notice: Subject to any disclaimer, the term of this patent is extended or adjusted under 35 U.S.C. 154(b) by 349 days.

(21) Appl. No.: 13/858,448

(22) Filed: Apr. 8, 2013

(51) Int. Cl.
*G06F 21/00* (2013.01)
*G06F 21/50* (2013.01)

(52) U.S. Cl.
CPC ................................. *G06F 21/50* (2013.01)

(58) Field of Classification Search
CPC ....... G06F 21/50; G06F 21/55; G06F 21/564; G06F 21/565; G06F 21/566; G06F 21/65; G06F 21/552
USPC ................................. 726/13, 22–25
See application file for complete search history.

(56) References Cited

U.S. PATENT DOCUMENTS

| 2008/0263669 | A1* | 10/2008 | Alme | 726/24 |
| 2012/0278884 | A1* | 11/2012 | Menoher | 726/22 |
| 2013/0067579 | A1* | 3/2013 | Beveridge et al. | 726/24 |

* cited by examiner

*Primary Examiner* — Kambiz Zand
*Assistant Examiner* — Noura Zoubair
(74) *Attorney, Agent, or Firm* — Lindauer Law, PLLC

(57) ABSTRACT

Techniques are described for identifying security credentials or other sensitive information based on an entropy-based analysis of information included in documents such as source code files, object code files, or other types of files. A baseline information entropy may be determined for one or more documents, indicating a baseline level of randomness for information in the document(s). One or more of the documents may be analyzed to identify the presence of high entropy portions that have an information entropy above a threshold value. The threshold value may be based on the baseline information entropy, or based on other criteria such as a programming language of the document(s). Because security credentials may have a higher level of information entropy than the surrounding code, any high entropy portions of the document(s) may be identified as potential security risks.

20 Claims, 9 Drawing Sheets

ENTROPY-BASED DETECTION OF SENSITIVE INFORMATION IN CODE

BACKGROUND

Software development organizations generally implement processes and practices aimed at minimizing the security risks in the software they produce. One such practice may be to avoid hard-coding of security credentials into source code, given that the inclusion of security credentials in source code may make the software more vulnerable to attacks, or may compromise the security of the systems that are accessed using the security credentials. Regardless of such practices, inexperienced or inattentive software developers may still produce code that includes hard-coded security credentials.

Figure 1:
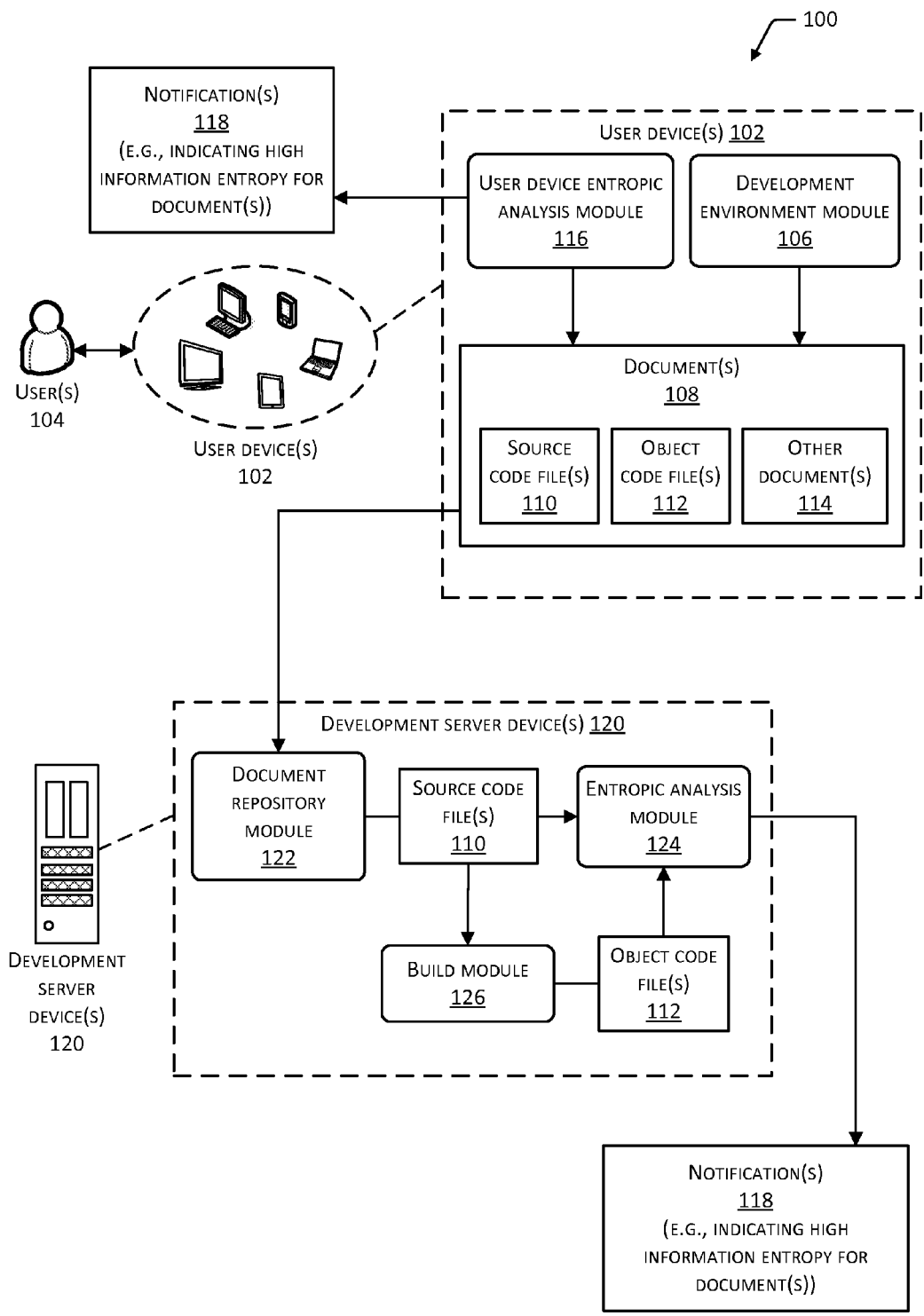
FIG. 1 depicts an environment including one or more user devices and one or more server devices configured to perform operations for entropy-based analysis of documents to identify sensitive information included in the documents.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for performing an entropy-based analysis of information in one or more documents, to identify potentially sensitive information indicated by high entropy portions of the document(s). In some instances, software developers may hard-code security credentials or other sensitive information into the source code of a computer program. This may inadvertently expose the security credentials to users who may have access to a source code repository that stores the source code, and such users may then employ the security credentials to access systems that they may not be authorized to access. Moreover, the hard-coding of security credentials into source code may enable potential attackers to obtain the security credentials by reverse engineering the object code that is built from the source code and released to the public.

Although some developers may not understand the risks of hard-coding security credentials in source code, such developers may understand that security credentials are more effective if they exhibit a certain amount of randomness. Accordingly, security credentials that are hard-coded in source code may exhibit a higher degree of randomness than the surrounding source code. Such randomness may be measured as information entropy. Accordingly, implementations may analyze a document, such as a source code file or an object code file, to identify portions of the document that exhibit an information entropy that is above a threshold information entropy. The high entropy portions may then be identified as potentially sensitive information to be investigated for security risks.

As used herein, sensitive information may describe any information that is to be secured to hinder dissemination to the public, or that is at least to be secured to hinder dissemination to a wider audience than one or more authorized users. Sensitive information may comprise secure information that enables access to secure systems or that enables secure communications. For example, secure information may include security credentials employed to access a system, such as a username, a password, a token, a certificate, a passkey, and so forth. As another example, secure information may also include security credentials employed in secure communications, such as a public or private cryptographic key, a digital certificate, or other credentials employed in a secure authentication such as that provided by the Secure Sockets Layer (SSL), Transport Layer Security (TLS), or other protocol.

Sensitive information may also include other types of information, such as an initialization vector for a cipher, an Ethernet address, a media access control (MAC) address, a universally unique identifier (UUID), a Uniform Resource Locator (URL), and so forth. The secure information described above, and other types of sensitive information, may exhibit a high degree of information entropy compared to the other information in the analyzed documents, and may be identifiable via an entropy-based document analysis as described herein. Although the examples provided herein describe performing an entropy-based analysis to identify secure information, implementations also support the identification of other types of sensitive information and are not limited to the examples provided herein.

As used herein, information entropy describes a measured degree of uncertainty or randomness of information. The information entropy may measure the extent to which a portion of information in a document is predictable based on the preceding information in the document, with more predictable information exhibiting a lower information entropy. Information entropy may refer to the Shannon entropy, which measures an expected value of information included in a document. A higher value of information entropy may indicate a greater degree of randomness in the information. Information entropy may be measured in various units, such as bits per character. As used herein, the term entropy refers to information entropy.

In some implementations, the information entropy of text in a document may be determined as inversely proportional to a frequency at which various words or strings occur in the document. For example, frequently or commonly occurring words or strings may have low information entropy, and infrequently or uncommonly occurring words or strings may have high information entropy. Words or other strings that occur once in a document may exhibit a maximum information entropy relative to other words or strings. In some cases, hard-coded security credentials or other secure information may have been inserted in a few locations or once in a document. Such rarely or singularly occurring words or strings may be identified as having high information entropy and be flagged for further investigation. Accordingly, implementations may employ word or string frequency to determine information entropy, in addition to or instead of the information entropy calculated based on Shannon entropy as described above.

Implementations may analyze at least a portion of the information included in one or more documents to identify those portions that exhibit high information entropy. As used herein, a document may refer to a file, or any other collection of information, to be analyzed. The analyzed documents may include any type of information in any format. In a software development environment, the documents may include one or more source code files, object code files, binary executables, makefiles, or other types of files associated with computer software, as described further with reference to FIG. 1.

FIG. 1 depicts an environment 100 including one or more devices that are configured to perform an entropy-based analysis of documents to identify sensitive information included in the documents. The environment 100 may include one or more user devices 102. The user device(s) 102 may be operated by, or otherwise associated with, one or more users 104. In some cases, the user(s) 104 may be members of a software development team, such as developers, testers, program managers, build managers, and the like. Other types of user(s) 104 may also employ the user device(s) 102.

The user device(s) 102 may be any type of computing device, including, but not limited to, a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the user device(s) 102 is described further with reference to FIG. 2.

In some implementations, the user device(s) 102 may include a development environment module 106 that enables the user 104 to generate one or more documents 108. In some cases, the development environment module 106 may be a stand-alone text editor such as vi, originally developed by Bill Joy; Emacs, developed by the GNU™ project; WordPad® or Notepad®, produced by Microsoft Corporation of Redmond, Wash., USA; and so forth. The development environment module 106 may also include a word processing program such as Word®, produced by Microsoft Corporation of Redmond, Wash., USA; WordPerfect®, produced by Corel Corporation of Ottawa, Ontario, Canada; and so forth. The development environment module 106 may also include an Integrated Development Environment (IDE), such as Eclipse®, provided by the Eclipse Foundation; Visual Studio®, provided by Microsoft Corporation of Redmond, Wash., USA; and so forth. Such an IDE may include a text editor along with one or more software development tools such as compilers, linkers, interpreters, debuggers, and the like. The development environment module 106 may also include other types of applications or programs that generate the document(s) 108, including spreadsheet or accounting applications, document scanning or imaging applications, and so forth.

The development environment module 106 may enable the user 104 to generate the document(s) 108 by entering text, entering commands, or otherwise providing information to be included in the document(s) 108. The document(s) 108 may include one or more source code files 110 that include source code defining one or more computer programs. The source code file(s) 110 may include source code for classes, objects, methods, structures, functions, libraries, headers, and other elements of one or more computer programs. The source code files(s) 110 may also include makefiles, string tables, or any other information for defining or building a computer program.

The document(s) 108 may also include one or more object code files 112 that include machine-readable object code generated from the compilation of source code files 110. The object code file(s) 112 may also include executable binary code for one or more computer programs, generated by compiling and linking the source code. In some cases, the object code file(s) 112 may include intermediate language code that is generated from the compilation of source code, and that is executable as a computer program by an interpreter, a virtual machine, or a runtime. For example, the object code file(s) 112 may include Java® language bytecodes that are produced by the compilation of Java® source code and that are executable by a Java® virtual machine, according to the Java® language specification provided by Oracle Corporation of Redwood City, Calif., USA.

The document(s) 108 may also include one or more other document(s) 114. Such other document(s) 114 may include, but are not limited to, unformatted text files and formatted text files such as those generated by Word®, produced by Microsoft Corporation of Redmond, Wash., USA; WordPerfect®, produced by Corel Corporation of Ottawa, Ontario, Canada; and so forth. Implementations support the entropy-based analysis of any number and type of the documents 108.

In some implementations, the user device(s) 102 may include a user device entropic analysis module 116. The user device entropic analysis module 116 may analyze the information included in the document(s) 108 and identify any portions that have an information entropy exceeding a predetermined threshold information entropy. In some cases, the user device entropic analysis module 116 may be incorporated into the development environment module 106 as a plug-in, module, or component. Alternatively, the user device entropic analysis module 116 may operate as a separate module from the development environment module 106.

The user device entropic analysis module 116 may identify any high entropy portions of the document(s) 108 written by the user 104 in the development environment module 106. The high entropy portions may be indicated to the user 104 by notifications 118, such as warnings, errors, or other messages that describe the identified high entropy portion(s) of the document(s) 108. In some cases, the notification(s) 118 may be presented through the development environment module 106. Alternatively, the notification(s) 118 may be sent as messages through other user interface elements of the user device(s) 102, or through communications such as email, text messages, and so forth.

In some implementations, the entropy-based analysis of the document(s) 108 may be performed as the user 104 is creating the document(s) 108 in the development environment module 106, and the notification(s) 118 may be sent in real time, substantially contemporaneously with the user 104 writing the document(s) 108. Alternatively, the entropy-based analysis may be performed in response to a command entered by the user 104 requesting the analysis, and the notification(s) 118 may be provided following the analysis.

The user device(s) 102 may communicate with one or more development server devices 120 to send the document(s) 108 to the development server device(s) 120. The development server device(s) 120 may be any type of computing device, including, but not limited to, a desktop computer, a personal computer, a mainframe computer, a server computer, a network computer, a cloud computing device, and so forth. An example of the development server device(s) 120 is described further with reference to FIG. 3.

In some implementations, the development server device(s) 120 may include a document repository module 122, which stores one or more of the documents 108. The document repository module 122 may include a source control system, a source code repository, or a revision control system, such as Perforce® developed by Perforce Software Inc., of Alameda, Calif., USA. The source code file(s) 110, object code file(s) 112, or other document(s) 114 generated on the user device(s) 102 may be checked into, or otherwise provided to, the document repository module 122. The document repository module 122 may then store the document(s) 108 in data storage on the development server device(s) 120 or elsewhere. In some cases, the document repository module 122 may be employed to access (e.g., check out) the document(s) 108 and view information regarding the history of document changes, documents ownership, check-ins, and so forth.

In some implementations, the development server device(s) 120 may include an entropic analysis module 124. The entropic analysis module 124 may analyze the information included in one or more documents 108, and identify any portions that have an information entropy exceeding a predetermined threshold information entropy. The identified high entropy portions of the document(s) 108 may be reported as including potentially sensitive information or portions of interest to be further examined.

As shown in FIG. 1, the entropic analysis module 124 may analyze one or more of the source code files 110 checked into the document repository module 122, and identify any high entropy portions of such source code files 110. Alternatively, the entropic analysis module 124 may analyze one or more object code files 112. The object code files 112 may be generated by a build module 126 that executes on the development server device(s) 120. The build module 126 may retrieve the source code file(s) 110 from the document repository module 122, and may perform operations for compiling, linking, or otherwise building the object code file(s) 112 from the source code file(s) 110. The entropic analysis module 124 may also analyze one or more other document(s) 114, such as formatted or unformatted text documents.

The entropy-based analysis of the document(s) 108 may be performed on the user device(s) 102 by the user device entropic analysis module 116, on the development server device(s) 120 by the entropic analysis module 124, or on both the user device(s) 102 and the development server device(s) 120. On the development server device(s) 120, the entropic analysis module 124 may perform an entropy-based analysis of the document(s) 108 when they are checked into, added to, or updated in the document repository module 122. Alternatively, the entropic analysis module 124 may perform an entropy-based analysis of the source code file(s) 110 or the object code file(s) 112 at build time, when the build module 126 performs build operations to generate the object code file(s) 112. Moreover, the entropic analysis module 124 may perform an entropy-based analysis of any of the document(s) 108 at any time, in response to a user request for such an analysis, or as a scheduled job. Operations of one or both of the user device entropic analysis module 116 and the entropic analysis module 124 are described further with reference to FIGS. 4-9.

In some implementations, the entropic analysis module 124 may send the notification(s) 118, indicating the portions of the document(s) 108 that exhibit high information entropy. Such notification(s) 118 may be sent to the user(s) 104 that created or edited the document(s) 108 to include the high information entropy portions. The notification(s) 118 may also be sent to other user(s) 104, such as program managers, build managers, testers, other developers, and so forth. The notification(s) 118 may include emails, text messages, or other types of communications, and may describe those portions of the document(s) 108 that have been identified as having a high information entropy. The notification(s) 118 may enable those users 104 receiving the notification(s) 118 to investigate whether the high information entropy portions correspond to potential security risks such as hard-coded security credentials or other types of sensitive information. In some cases, the user device entropic analysis module 116 may also send the notification(s) 118, instead of or in addition to providing warnings or other notifications 118 via the development environment module 106. Implementations support providing the notification(s) 118 from the development server device(s) 120, from the user device(s) 102, or from both.

In addition to or instead of sending the notification(s) 118, one or both of the entropic analysis module 124 and the user device entropic analysis module 116 may perform other types of actions based on identifying high entropy portions of the document(s) 108. In some cases, the high entropy portions may be deleted from the document(s) 108. Alternatively, the high entropy portions may be disabled, for example, by commenting out the high entropy portions of the source code file(s) 110. The high entropy portions may also be replaced with other code that may present less of a potential security risk.

The various devices of the environment 100 may communicate with one another using one or more networks. Such networks may include public networks such as the Internet, private networks such as an institutional or personal intranet, or some combination of private and public networks. The networks may include any type of wired or wireless network, including, but not limited to, local area networks (LANs), wide area networks (WANs), wireless WANs (WWANs), wireless LANs (WLANs), and mobile communications networks (e.g. 3G, 4G, and so forth).

Figure 2:
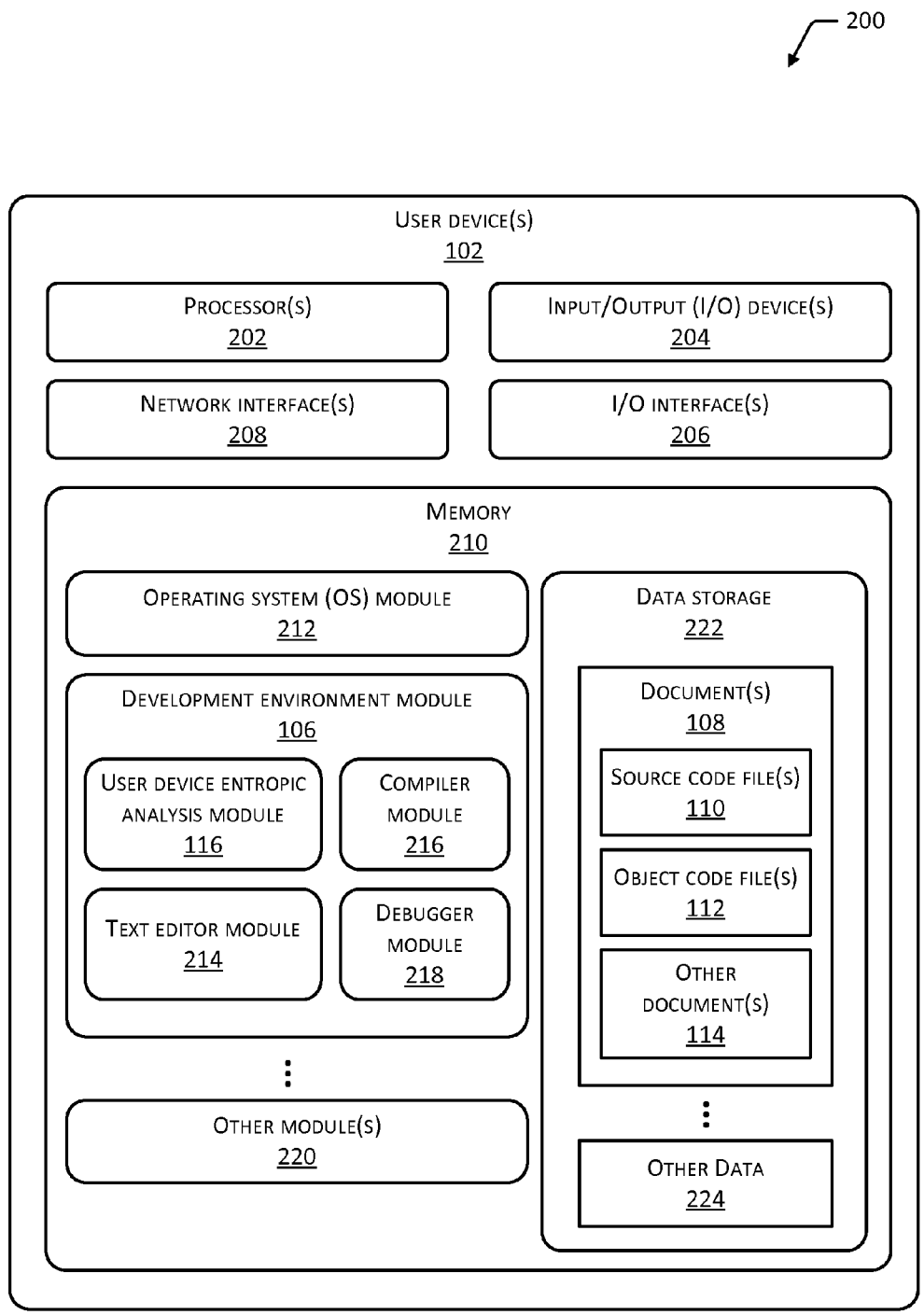
FIG. 2 depicts a block diagram of a user device configured to perform operations for identifying sensitive information based on entropy-based analysis.

FIG. 2 depicts a block diagram 200 of an example user device 102 that is configured to perform operations for identifying sensitive information based on entropy-based analysis. As shown in the block diagram 200, the user device(s) 102 may include one or more processors 202 configured to execute one or more stored instructions. The processor(s) 202 may comprise one or more cores.

The user device(s) 102 may include one or more input/output (I/O) devices 204. The I/O device(s) 204 may include input devices such as a keyboard, a mouse, a pen, a game controller, a touch input device, an audio input device (e.g., a microphone), an image capture device (e.g., a camera), a gestural input device, a haptic input device, or other devices. The I/O device(s) 204 may also include output devices such as a display, an audio output device (e.g., a speaker), a printer, a haptic output device, an olfactory (e.g., smell-based) output device, a gustatory (e.g., taste-based) output device, and so forth. The I/O device(s) 204 may be physically incorporated with the user device(s) 102, or may be externally placed.

The user device(s) 102 may include one or more I/O interfaces 206 to enable components or modules of the user device(s) 102 to control, interface with, or otherwise communicate with the I/O device(s) 204. The I/O interface(s) 206 may enable information to be transferred in or out of the user device(s) 102, or between components of the user device(s) 102, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The user device(s) 102 may also include one or more busses or other internal communications hardware or software that allow for the transfer of data between the various modules and components of the user device(s) 102.

The user device(s) 102 may include one or more network interfaces 208 to enable communications between the user device(s) 102 and other networked devices. The network interface(s) 208 may include one or more network interface controllers (NICs) or other types of transceiver devices configured to send and receive communications over a network.

The user device(s) 102 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the user device(s) 102.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS™ from Apple Inc. of Cupertino, Calif., USA; any version of Windows® or Windows Mobile® from Microsoft Corporation of Redmond, Wash., USA; any version of Android® from Google, Inc. of Mountain View, Calif., USA and its derivatives from various sources; any version of Palm OS® from Palm Computing, Inc. of Sunnyvale, Calif., USA and its derivatives from various sources; any version of BlackBerry OS® from Research In Motion Ltd. of Waterloo, Ontario, Canada; any version of VxWorks® from Wind River Systems of Alameda, Calif., USA; or other operating systems.

In some implementations, the memory 210 includes the development environment module 106. As described above, the development environment module 106 may include a text editor module 214. In some cases, the development environment module 106 may be a stand-alone text editor module 214 that generates formatted or unformatted text files, source code files 110, or other types of files. Alternatively, the development environment module 106 may include a text editor module 214 that interacts with one or more other modules in a suite of development tools, such as in an IDE. In such cases, the development environment module 106 may include a compiler module 216 that compiles source code file(s) 110 to generate object code file(s) 112, a debugger module 218 for debugging a computer program, and so forth.

The development environment module 106 may include other modules for performing software development tasks, such as a linker module, an interpreter module, or an execution module to respectively perform link, interpretation, or execution operations. The development environment module 106 may also include a user interface for displaying the source code file(s) 110 or other information. The development environment module 106 may perform tasks related to the generation of the source code file(s) 110, the object code file(s) 112, or other document(s) 108 generated during the software development process. The development environment module 106 may also perform operations to generate other types of document(s) 108 not associated with software development.

As shown in the example of FIG. 2, the user device entropic analysis module 116 may be included in the development environment module 106 (e.g., as a plug-in module or component). Alternatively, the user device entropic analysis module 116 may execute as a separate module or process on the memory 210. Operations of the user device entropic analysis module 116 are described further with reference to FIGS. 4-9.

The memory 210 may also include one or more other modules 220, such as a user authentication module, an access control module, a security or cryptography module, and so forth.

The memory 210 may include data storage 222 to store information for operations of the user device(s) 102. The data storage 222 may comprise a database, array, structured list, tree, or other data structure, and may be a relational or a non-relational datastore. The data storage 222 may store the document(s) 108, including, but not limited to, the source code file(s) 110, the object code file(s) 112, and the other document(s) 114. The data storage 222 may also store other data 224, such as user account information, user authentication information, and so forth. In some implementations, at least a portion of the information stored in the data storage 222 may be stored externally to the user device(s) 102, on other devices that are accessible to the user device(s) 102 via the I/O interface(s) 206 or via the network interface(s) 208.

Figure 3:
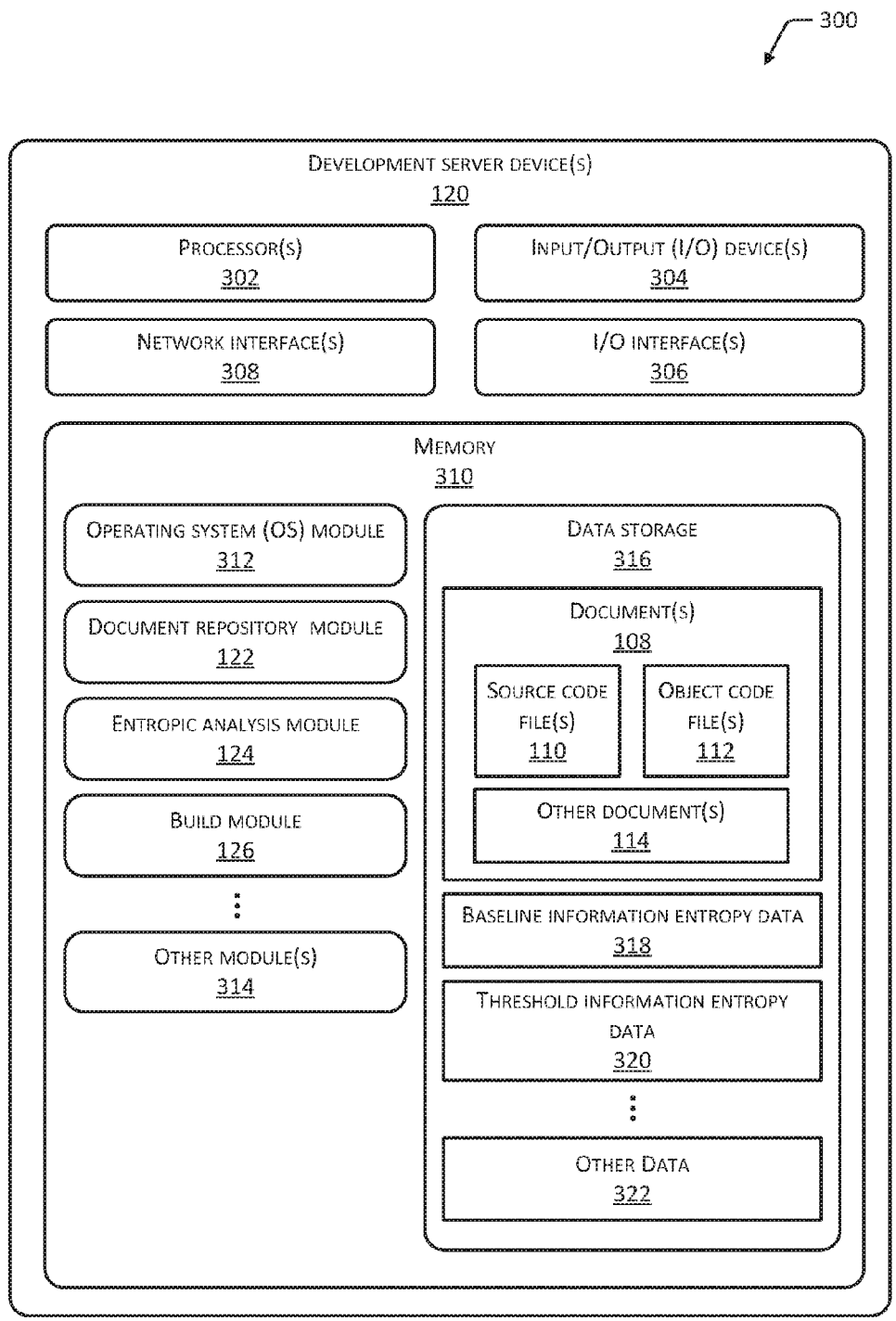
FIG. 3 depicts a block diagram of a development server device configured to perform operations for identifying sensitive information based on entropy-based analysis.

FIG. 3 depicts a block diagram 300 of an example development server device 120 that is configured to perform operations for identifying sensitive information based on entropy-based analysis. As shown in the block diagram 300, the development server device(s) 120 may include one or more processors 302 configured to execute one or more stored instructions. The processor(s) 302 may comprise one or more cores.

The development server device(s) 120 may include one or more I/O devices 304, one or more I/O interfaces 306, and one or more network interfaces 308, such as those described above in FIG. 2 with reference to the I/O device(s) 204, the I/O interface(s) 206, and the network interface(s) 208, respectively. The I/O device(s) 304 may be physically incorporated with the development server device(s) 120, or may be externally placed.

The development server device(s) 120 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the development server device(s) 120.

The memory 310 may include an OS module 312 that is configured to manage hardware resources such as the I/O device(s) 304, the I/O interface(s) 306, and the network interface(s) 308, and to provide various services to applications, processes, or modules executing on the processor(s) 302. The OS module 312 may include one or more operating systems such as those described above in FIG. 2 with reference to the OS module 212.

In some implementations, the memory 310 includes the document repository module 122 and the build module 126, as described above with reference to FIG. 1. The memory 310 may also include the entropic analysis module 124, described further with reference to FIGS. 4-9. The memory 310 may also include one or more other modules 314, such as a user authentication module, an access control module, a security or cryptography module, and so forth.

The memory 310 may include data storage 316 to store information for operations of the development server device(s) 120. The data storage 316 may comprise a database, array, structured list, tree, or other data structure, and may be a relational or a non-relational datastore. The data storage 316 may store the document(s) 108, including, but not limited to, the source code file(s) 110, the object code file(s) 112, and the other document(s) 114. In some implementations, the data storage 316 may store baseline information entropy data 318 and threshold information entropy data 320, as described further with reference to FIGS. 5 and 7. The baseline information entropy data 318 and the threshold information entropy data 320 may also be stored on the user device(s) 102, and employed during operations of the user device entropic analysis module 116.

The data storage 316 may also store other data 322, such as user account information, user authentication information, and so forth. In some implementations, at least a portion of the information stored in the data storage 316 may be stored externally to the development server device(s) 120, on other devices that are accessible to the development server device(s) 120 via the I/O interface(s) 306 or via the network interface(s) 308.

Figure 4:
FIG. 4 depicts an example document comprising source code that includes one or more high entropy portions corresponding to hard-coded sensitive information.

FIG. 4 depicts a schematic 400 of an example document 108. In this example, the document 108 is a source code file 110, comprising source code that includes one or more high entropy portions 402 corresponding to hard-coded sensitive information. In this example, the author of the source code file 110 has hard-coded two instances of sensitive information that may be identified as high entropy portions 402 by the user device entropic analysis module 116 or the entropic analysis module 124. The high entropy portion 402(1) corresponds to a password that has been hard-coded into the source code file 110. The high entropy portion 402(2) corresponds to at least a portion of a private key that has been hard-coded into the source code file 110. In each case, the high degree of randomness of the hard-coded sensitive information may enable such information to be identified as high entropy portions 402.

The entropy-based analysis may identify the high entropy portion(s) 402 as potentially secure information or other types of sensitive information. Alternatively, the high entropy portion(s) 402 may be identified as portion(s) of interest to be further investigated by one or more of the users 104 or by other personnel to determine whether the portion(s) of interest are security risks. In some cases, there may be appropriate software development practices that include the hard-coding of digital certificates into source code. For example, when attackers are attempting to compromise security that is based on SSL or TLS, they may attempt to compromise the certificate granting authority itself. In such cases, a developer may hard-code a certificate into source code to confirm that a certificate received from the granting authority is legitimate and that the authority has not been compromised. The hard-coded certificate may be replaced with a subsequently issued certificate if it is known that the issuing authority is trustworthy. In such cases, subsequent investigation may reveal that the hard-coding of the high entropy information was appropriate, and does not present a security risk.

Figure 5:
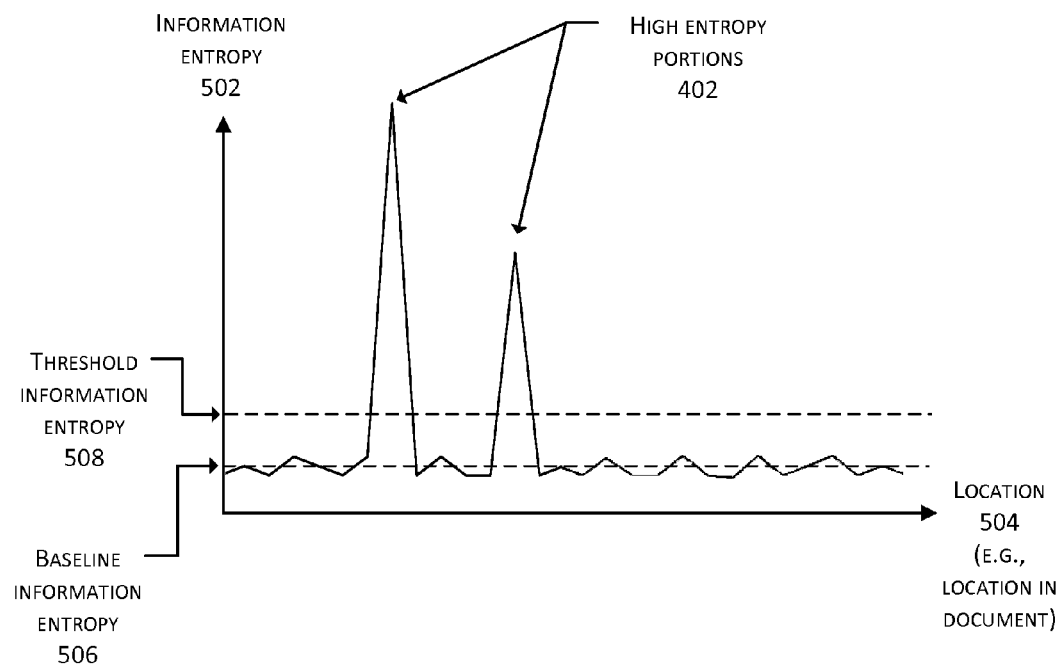
FIG. 5 depicts a graph showing information entropy as a function of the location in an analyzed document such as a source code file.

FIG. 5 depicts a graph 500 showing information entropy 502 plotted as a function of location 504, such as the location in an analyzed document 108. In this example, the information in the document 108 exhibits a baseline information entropy 506. The baseline information entropy 506 may be an average, a mean, a median, or some other statistical measure of an overall information entropy of the information in the document 108. In some implementations, a threshold information entropy 508 may be determined based on the baseline information entropy 506, or based on other criteria. Those portions of the document 108 having an information entropy 502 that meets or exceeds the threshold information entropy 508 may be identified as the high entropy portions 402. Determination of the baseline information entropy 506 and the threshold information entropy 508 is described further with reference to FIG. 7.

Figure 6:
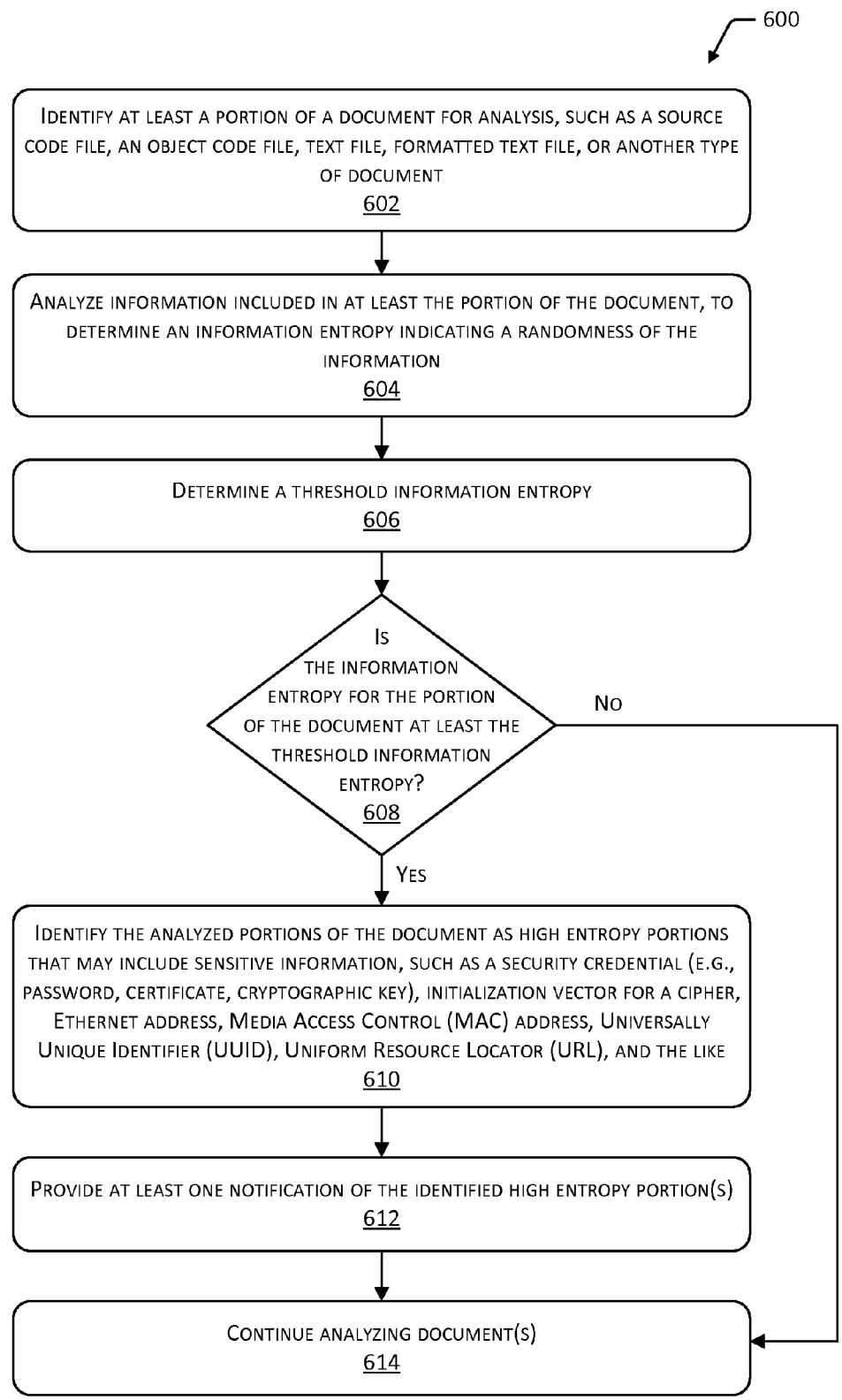
FIG. 6 depicts a flow diagram of a process for analyzing one or more documents to identify any portions of the document(s) that have a high information entropy relative to a threshold information entropy.

FIG. 6 depicts a flow diagram 600 of a process for analyzing one or more documents 108 to identify any portions of the document(s) 108 that exhibit a high information entropy relative to a threshold information entropy. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 602, at least a portion of a document 108 is identified to be analyzed. In some cases, an entire document 108 such as a source code file 110, an object code file 112, or other document 114 such as a formatted or unformatted text file may be analyzed to identify high entropy portions 402. Alternatively, any part of the document 108 may be analyzed. In some implementations, those parts of the document 108 that have been changed since a previous analysis may be re-analyzed to identify any high entropy portions 402 that may have been added since the previous analysis. In some cases, the document 108 to be analyzed may be one of a plurality of documents 108, such as the documents 108 that comprise a source code tree managed by the document repository module 122.

At 604, the information included in at least a portion of the document 108 may be analyzed to determine an information entropy of that portion of the document 108. As described above, the information entropy may indicate a degree of randomness in the information. The information entropy may be measured using various methods and may be expressed in various units of measure, such as bits per character. In some implementations, the information entropy is measured as a Shannon entropy.

At 606, a threshold information entropy 508 is determined, based on a baseline information entropy 506 or based on other criteria. The determination of the threshold information entropy 508 is described further with reference to FIG. 7.

At 608, a determination is made whether the information entropy of the analyzed portion(s) of the document 108 surpasses the threshold information entropy 508. If not, then the process may proceed to 614. If so, then the process may proceed to 610.

At 610, the portion(s) of the document 108 determined to have a high information entropy compared to the threshold information entropy 508 may be identified as high entropy portion(s) 402 or portions of interest that potentially include sensitive information. As described above, sensitive information may include secure information, such as one or more of a password, a certificate, a cryptographic key, an initialization vector for a cipher, an Ethernet address, a MAC address, a UUID, a URL, and so forth.

At 612, at least one notification 118 is provided to one or more users 104, describing the identified high entropy portions 402 of the analyzed document 108. In some cases, the notification(s) 118 may be provided through the development environment module 106 executing on the user device(s) 102. For example, an entropy-based analysis of source code may be performed as the user 104 is typing the source code into the development environment module 106. In such cases, the notification 118 may be in the form of a warning, alert, error, or some other indication that one or more high entropy portions 402 have been identified in the source code. Such notifications 118 may be described as real time notifications 118, and are described further with reference to FIG. 8. Alternatively, the notification(s) 118 may be sent as emails, text messages, or other communications from one or both of the user device(s) 102 and the development server device(s) 120, and may be sent following a check-in or a build of the source code. Such notifications 118 are described further with reference to FIG. 9.

At 614, the process may continue analyzing the document(s) 108, to identify any additional high entropy portions 402 that may be present in the document(s) 108.

Figure 7:
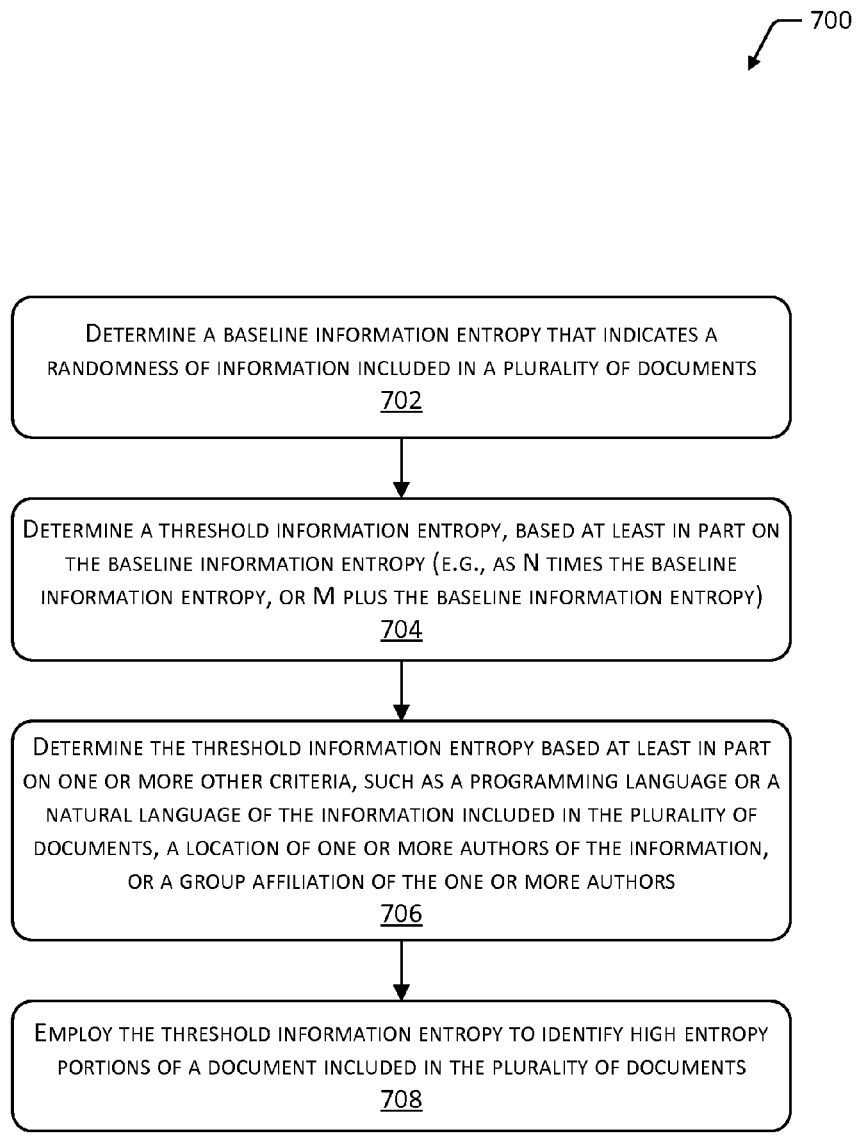
FIG. 7 depicts a flow diagram of a process for determining a threshold information entropy based on a baseline information entropy for one or more documents, or based on other criteria.

FIG. 7 depicts a flow diagram 700 of a process for determining a threshold information entropy 508 based on a baseline information entropy 506 for one or more documents 108, or based on other criteria. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 702, a baseline information entropy 506 that indicate a randomness of information may be determined based on analyzing information in at least a portion of one or more documents 108. The baseline information entropy 506 may be calculated as an average, a mean, or another statistical measure of the overall information entropy in one or more documents 108. In some cases, the baseline information entropy 506 may be based on a plurality of documents 108 that include the document 108 that is to be examined for high entropy portions 402. For example, the document 108 to be examined may be one of a plurality of documents 108 that describe one or more computer programs, and that constitute a source code tree managed by the document repository module 122. All of the source code tree, or a portion of the source code tree, may be analyzed to determine the baseline information entropy 506. The baseline information entropy 506 may also be based on a plurality of documents 108 that describe a same program module or a same computer program, a plurality of documents 108 produced by a same development organization, or other sets of documents 108. In some cases, the baseline information entropy 506 may be based on the information in the document 108 that is to be examined for high entropy portions 402.

In some implementations, the baseline information entropy 506 may be periodically updated. For example, a scheduled process may execute nightly, weekly, or at other scheduled times to recalculate the baseline information entropy 506 for one or more documents 108. The baseline information entropy 506 may be stored as the baseline information entropy data 318, for use in subsequent entropy-based analyses of the document(s) 108.

At 704, a threshold information entropy 508 may be determined based at least in part on the baseline information entropy 506 calculated at 702. In some implementations, the threshold information entropy 508 may be mathematically related to the baseline information entropy 506. For example, the threshold information entropy 508 may be N times the baseline information entropy 506, where N is a predetermined multiplicative factor or multiplicative constant. Alternatively, the threshold information entropy 508 may be M plus the baseline information entropy 506, where M is a predetermined additive factor or additive constant. In some implementations, a statistical variance, spread, standard deviation, or other measure of the distribution of the baseline information entropy 506 may be calculated, and the threshold information entropy 508 may be N times the measured variance. The threshold information entropy 508 may be set at a level such that inaccurate identifications (e.g., false positives) of high entropy portions 402 are minimized.

At 706, the threshold information entropy 508 may be determined based on one or more other criteria. Such criteria may include a programming language for source code in the document(s) 108 being examined, or a natural language of information in the document(s) 108 being examined. Various programming languages and natural languages may exhibit various information entropies overall. For example, the information entropy of a natural language such as English may vary between 0.5 and 1.5 bits per character over a corpus of information expressed in that language. Because structured languages such as programming languages may exhibit a higher degree of structure, and therefore a lower degree of randomness, such structured languages may exhibit a lower level of information entropy than that of a natural language.

The threshold information entropy 508 may also be based at least in part on a physical location of one or more authors of the document(s) 108 being examined. For example, developers in one part of the world may, due to cultural or other differences, tend to generate source code that exhibits a different level of information entropy than code generated by developers in another part of the world. Moreover, the threshold information entropy 508 may also be based on a group affiliation of the author(s) of the document(s) 108 being examined because certain development teams or other organizations may share a coding style that affects the information entropy of the code they write. The threshold information entropy 508 determined at 704 and 706 may be stored as the threshold information entropy data 320.

At 708, the threshold information entropy 508 may be employed to identify any high entropy portions 402 that are present in the document 108 being examined, as described above. In some implementations, the threshold information entropy 508 may be adjusted over time to minimize false positives or inaccurate identifications of high entropy portions 402 of document(s) 108.

In some implementations, supervised or unsupervised machine learning techniques may be employed to determine the threshold information entropy 508, instead of or in addition to the other techniques described with reference to FIG. 7. For example, machine learning techniques may employ training data describing previously analyzed document(s) 108 and previously identified high entropy portions 402. The training data may be employed to train one or both of the user device entropic analysis module 116 and the entropic analysis module 124 to more reliably identify high entropy portions 402 that may constitute security risks in the document(s) 108.

In some implementations, the threshold information entropy 508 may be determined independently of any calculation of the baseline information entropy 506. The threshold information entropy 508 may be selected by a user 104, an operator of the development server device(s) 120, or some other user 104. In such cases, the threshold information entropy 508 may be tuned or otherwise adjusted over time based on results of one or more entropy-based analyses of the document(s) 108. For example, if analyses are producing false positive identifications of high entropy portion(s) 402 of documents 108, the threshold information entropy 508 may be increased to reduce the number of such false positive identifications. Moreover, the threshold information entropy 508 may be lowered if high entropy portion(s) 402 are going undetected during the entropy-based analyses.

Moreover, in cases where the information entropy is calculated as inversely proportional to a frequency of words or strings in the document(s) 108 as described above, the threshold information entropy 508 may be associated with the information entropy of words or strings that occur a small number of times, or that occur once, within one or more of the documents 108. In such cases, the threshold information entropy 508 may be set at or just below the information entropy value for a singularly or rarely occurring string or word.

Figure 8:
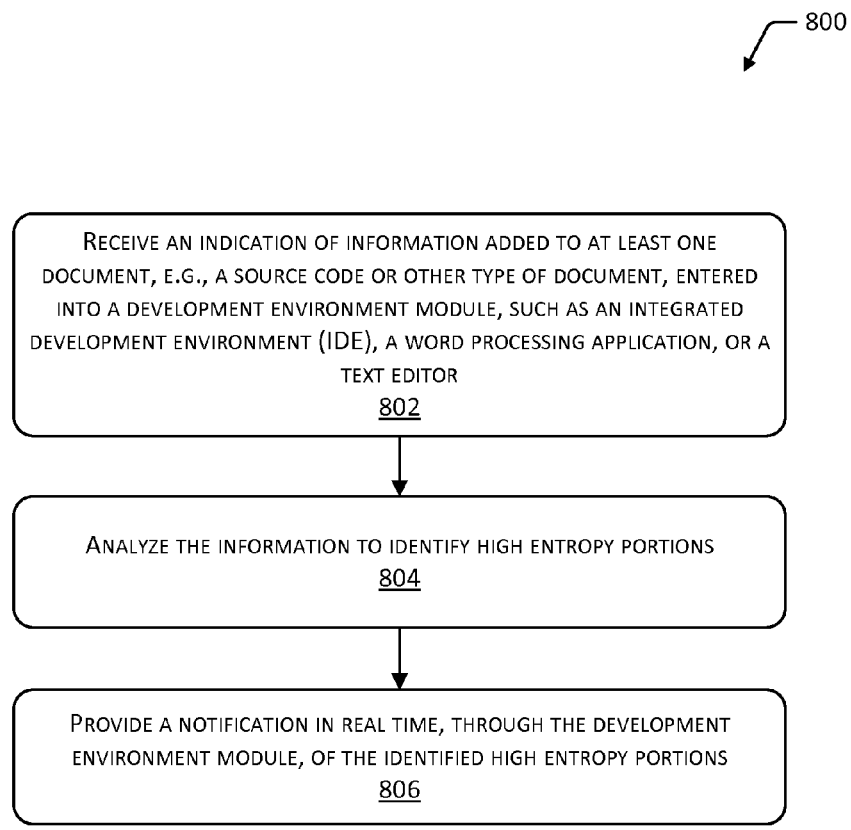
FIG. 8 depicts a flow diagram of a process for providing a notification of one or more high entropy portions of a document, in real time as the document is being written or generated.

FIG. 8 depicts a flow diagram 800 of a process for providing a notification 118 of one or more high entropy portions 402 of a document 108, in real time as the document 108 is being written or generated. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 802, an indication is received of source code, object code, formatted or unformatted text data, or other information added to at least one document 108. For example, an indication may be received of source code added to a source code file 110 while it is being edited or created by a developer using the development environment module 106. At 804, the information may be analyzed to identify any high entropy portions 402 of the information, as described above.

At 806, one or more notifications 118 may be provided that describe the identified high entropy portions 402 of the document 108 being edited. In some cases, the notifications 118 may be provided in real time, at a time that is substantially concurrent with the addition of the information into the document 108 being edited. For example, a developer editing a source code file 110 may type in a security credential such as a password, a cryptographic key, a certificate, or some other type of high entropy information, to code the credential into the source code file 110. As the developer is typing the credential, or shortly thereafter, a graphical indication may be displayed indicating the credential as a high entropy portion 402 of the document 108. Such an indication may be a presentation of a wavy colored line under the credential in a text editor window, a highlight of the credential, or a displayed message indicating that the user 104 has typed in high entropy information. The indication may be an alert or warning that provides a description of the potentially sensitive information that has been added to the source code file 110. Alternatively, the indication may be an error that prevents compilation of the source code file 110 until the high entropy information has been edited or removed.

As used herein, the term real time describes an event or process that is performed concurrently with, or within a short time period of, another event or process. Because the indication at 806 is provided at approximately the same time as the user 104 has entered the information into the edited document 108, or shortly thereafter, the notification 118 may be described as a real time notification 118, presented substantially concurrently with the entry of the information into the document 108. Alternatively, the notification 118 may be provided following an attempted compilation or save of the source code file 110 being edited.

Figure 9:
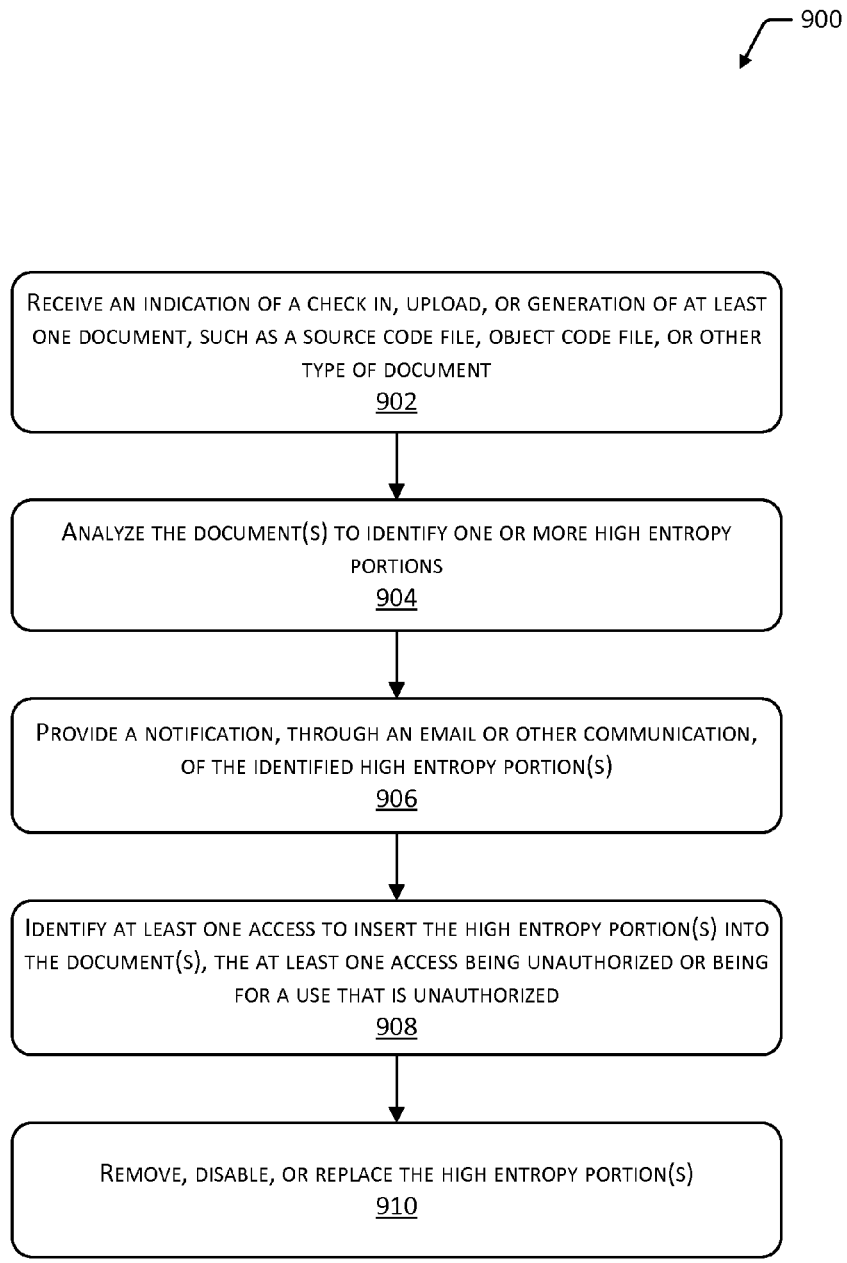
FIG. 9 depicts a flow diagram of a process for providing a notification of one or more high entropy portions of a document, during subsequent processing of the document.

FIG. 9 depicts a flow diagram 900 of a process for providing a notification 118 of one or more high entropy portions 402 of a document 108, the notification 118 provided subsequent to a check-in, upload, or other generation of the document 108. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 902, an indication is received of at least one document 108 that has been checked in, uploaded, generated, or otherwise made available to the user device entropic analysis module 116 or the entropic analysis module 124. In some cases, the indication may be of a source code file 110 or other document 108 checked into the document repository module 122. Alternatively, the indication may be of a source code file 110 or other document 108 that has been saved following one or more edits through the development environment module 106. The indication may also be of an object code file 112 that has been newly built by the build module 126 or compiled by the development environment module 106.

At 904, the document(s) 108 are analyzed to identify any high entropy portions 402 that are present in the document(s) 108, as described above.

At 906, one or more notifications such as the notification(s) 118 may be provided describing the identified high entropy portion(s) 402. Such notifications 118 may be provided as emails, text messages, or other types of communications to a user 104 that authored the information that includes the high entropy portion(s) 402. Notifications 118 may also be provided to other users 104, such as program managers, supervisors, testers, build managers, or others. In some cases, the notifications 118 may include the entry of bug reports or tickets into a bug-tracking or issue-tracking system.

In some implementations, an entropy-based analysis may be performed to detect instances in which a person, a process, or other entity has gained access to the document repository module 122, or another module of the user device(s) 102 or the development server device(s) 120, and inserted obfuscated malware, unauthorized data, or malicious information into one or more documents 108. In such cases, the access itself may be unauthorized, or the access may have been authorized for types of uses other than that of the detected access. An entropy-based analysis may be performed to detect unauthorized information (e.g., malware) inserted into one or more source code files 110, object code files 112, or other document(s) 114. The unauthorized information may exhibit a different information entropy than authorized information, and the unauthorized information may be identifiable based on this difference. At 908, an identification is made of at least one access to insert the identified high entropy portion(s) 402 into the one or more documents 108, the at least one access being unauthorized or being for a use that is unauthorized.

At 910, in some implementations, additional actions may be taken based on the identification of high entropy portion(s) 402 of one or more documents 108. In some cases, the high entropy portion(s) 402 may be automatically removed from the documents 108. Alternatively, the high entropy portion(s) 402 may be disabled, such as through comments added to the source code file(s) 110. Such disabling may prevent the high entropy portion(s) 402 from being compiled into the object code file(s) 112. In some cases, the high entropy portion(s) 402 may be replaced with other information. For example, in cases where a developer has hard-coded security credentials into source code for accessing a system, the identified high entropy portion(s) 402 of the code may be removed and replaced with source code that accesses the system through a more secure method, such as through a secure credential provisioning service. Alternatively, the high entropy portion(s) 402 may be replaced with code that generates a message at compile time or at some other time, the message indicating that the potentially risky code has been replaced.

Implementations may perform an entropy-based analysis of the document(s) 108 at any stage in the development process that generates the document(s) 108. For example, one or more source code files 110 may be analyzed when they are checked into the document repository module 122, and notifications 118 of high entropy portions 402 of the checked in documents 108 may be presented as check-in errors or warnings. The analysis may be performed on all files checked into the document repository module 122, or on a subset of files checked in. For example, files checked into a production branch of a source code tree may be analyzed prior to their inclusion in production code for external release. Alternatively, source code files 110 or object code files 112 may be examined for high entropy portions 402 during or after a build process that generates the object code files 112 from the source code files 110. In such cases, the notifications 118 of high entropy portions 402 may be presented as build warnings or build errors. Moreover, implementations may analyze the object code files 112 such as binary executables provided through an application store or another service, to identify potential security risks present in such files.

The notifications 118 described with reference to FIGS. 8 and 9 may include sufficient information to enable one or more users 104 to investigate the identified high entropy portions 402, to determine whether such portions correspond to sensitive information that may leave a computer program vulnerable to attack. Accordingly, the notifications 118 may include information regarding the names and versions of the source code files 110 or other documents 108 that include the high entropy portion(s) 402. The notifications 118 may also describe the location(s) 504 of the high entropy portion(s) 402 in the document(s) 108, in terms of package, class, and method names, line numbers, or other location descriptions. The notifications 118 may also include at least an excerpt of the high entropy portion(s) 402.

Although the above examples describe performing an entropy-based analysis of newly edited source code file(s) 110 or other document(s) 108, implementations support the use of an entropy-based analysis in other scenarios. For example, implementations may be used to identify potential security risks included in third party code, imported code, inherited code, or legacy code, either in the form of source code or object code.

As another example, an entropy-based analysis may be performed to evaluate the quality of code generated by various users 104, or identify practices of the users 104 that may lead to lower quality code. For example, an overall decrease in the information entropy of code over time may indicate that one or more developers may be copying sections of code in multiple program modules, instead of more efficiently refactoring the copied code as a shared library. In some cases, the tracking of an overall information entropy of one or more source code files 110 may indicate that one or more developers are including too many or too few comments in their code, given that the natural language used in comments may tend to have a different information entropy than the programming language used to write the source code.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-implemented method for increasing security by identifying sensitive information in documents, the method comprising:
    analyzing an information entropy of a first document;
    determining, from the information entropy of the first document, a baseline information entropy for the first document that indicates a randomness of information included in the first document;
    from the baseline information entropy, determining a threshold information entropy;
    determining an information entropy of at least one portion of the first document;
    determining whether the information entropy of the at least one portion of the first document is at least the threshold information entropy;
    based on determining that the information entropy of the at least one portion of the first document is the at least the threshold information entropy, identifying the at least one portion of the first document as including at least one security risk; and
    generating a second document based on the first document, wherein the at least one portion of the first document identified as including the at least one security risk is one or more of disabled, removed, or replaced by the generating.

2. The method of claim 1, wherein the at least one security risk comprises one or more of a password, a cryptographic key, a certificate, an initialization vector for a cipher, an Ethernet address, a media access control (MAC) address, a universally unique identifier (UUID), or a uniform resource locator (URL).

3. The method of claim 1, wherein the threshold information entropy is based at least in part on a programming language or a natural language of the information included in the first document.

4. The method of claim 1, further comprising providing a notification describing the at least one portion of the first document as including the at least one security risk, wherein the notification is provided in real time as the at least one portion of the first document is identified as including the at least one security risk.

5. A system, comprising:
a memory storing computer-executable instructions; and a processor in communication with the memory, the processor configured to access the memory and execute the computer-executable instructions to: analyze a first document to determine an information entropy of the first document;
determine, from the information entropy of the analyzed first document, a baseline information entropy for the first document that indicates a randomness of information included in the first document; from the baseline information entropy, determine a threshold information entropy;
determine an information entropy of at least one portion of the first document;
determine whether the information entropy of the at least one portion of the first document is at least the threshold information entropy;
based on determining that the information entropy of the at least one portion of the first document is the at least the threshold information entropy,
identify the at least one portion of the first document as including at least one security risk, and generate a second document based on the first document,
wherein the at least one portion of the first document identified as including the at least one security risk is one or more of disabled, removed, or replaced by the generating.

6. The system of claim 5, wherein the information included in the at least one portion of the first document comprises one or more of: source code describing a computer program; intermediate language code describing the computer program; machine-executable object code describing the computer program; formatted text; or unformatted text.

7. The system of claim 5, wherein the at least one security risk includes one or more of a password, a cryptographic key, a certificate, an initialization vector for a cipher, an Ethernet address, a media access control (MAC) address, a universally unique identifier (UUID), or a uniform resource locator (URL).

8. The system of claim 5, the processor further configured to provide a notification describing the at least one portion of the first document as including the at least one security risk.

9. The system of claim 8, wherein the notification is provided in real time as the at least one portion of the first document is identified as including the at least one security risk.

10. The system of claim 8, wherein the notification is provided during processing of the first document that is performed subsequently to a generation of the at least one portion of the first document.

11. The system of claim 5, the processor further configured to determine the threshold information entropy based at least in part on a frequency of one or more strings in the first document.

12. The system of claim 5, the processor further configured to determine the threshold information entropy based at least in part on one or more of:
a programming language of the information included in the at least one portion of the first document; a natural language of the information included in the at least one portion of the first document; a location of one or more authors of the at least one portion of the first document; or
a group affiliation of the one or more authors of the at least one portion of the first document.

13. One or more non-transitory computer-readable media storing instructions which, when executed, instruct at least one processor to perform actions comprising:
analyzing a first document to determine an information entropy of the first document;
determining, from the information entropy of the analyzed first document, a baseline information entropy for the first document that indicates a randomness of information included in the first document; from the baseline information entropy, determining a threshold information entropy;
determining an information entropy of at least one portion of the first document;
determining whether the information entropy of the at least one portion of the first document is at least the threshold information entropy; based on determining that the information entropy of the at least one portion of the first document is the at least the threshold information entropy,
identifying the at least one portion of the first document as including at least one security risk;
and generating a second document based on the first document, wherein the at least one portion of the first document identified as including the at least one security risk is one or more of disabled, removed, or replaced by the generating.

14. The one or more non-transitory computer-readable media of claim 13, the actions further comprising: providing at least one notification describing the at least one portion of the first document as the at least one security risk.

15. The one or more non-transitory computer-readable media of claim 13, the actions further comprising: based on determining that the information entropy of the at least one portion of the first document is the at least the threshold information entropy, removing, disabling, or replacing the at least one portion of the first document.

16. The one or more non-transitory computer-readable media of claim 13, the actions further comprising: based at least partly on determining that the information entropy of the at least one portion of the first document is the at least the threshold information entropy, identifying at least one unauthorized use associated with an insertion of the at least one portion of the document into the first document.

17. The one or more non-transitory computer-readable media of claim 13, wherein: the information included in the first document describes at least one computer program, and the information comprises one or more of source code, intermediate language code, or machine-executable object code that describes the at least one computer program.

18. The one or more non-transitory computer-readable media of claim 13, the actions further comprising:
determining the threshold information entropy by adding a predetermined offset to the baseline information entropy.

19. The system of claim 5, wherein the processor is further configured to determine the threshold information entropy by adding a predetermined offset to the baseline information entropy.

20. The one or more non-transitory computer-readable media of claim 13, the actions further comprising providing at least one notification subsequent to a generation of the at least one portion of the first document.

* * * * *